(12) United States Patent
Tinnen et al.

(10) Patent No.: US 10,648,327 B2
(45) Date of Patent: May 12, 2020

(54) FLOW CONTROL DEVICE AND METHOD

(71) Applicant: TENDEKA B.V., Altens, Aberdeen (GB)

(72) Inventors: Bard Tinnen, Stavanger (NO); Havar Sortveit, Hommersak (NO)

(73) Assignee: TENDEKA B.V., Aberdeen (GB)

(*) Notice: Subject to any disclaimer, the term of this patent is extended or adjusted under 35 U.S.C. 154(b) by 569 days.

(21) Appl. No.: 14/376,567

(22) PCT Filed: Feb. 20, 2013

(86) PCT No.: PCT/GB2013/050402
§ 371 (c)(1),
(2) Date: Aug. 4, 2014

(87) PCT Pub. No.: WO2013/124644
PCT Pub. Date: Aug. 29, 2013

(65) Prior Publication Data
US 2015/0027715 A1    Jan. 29, 2015

(30) Foreign Application Priority Data
Feb. 21, 2012 (GB) .................................. 1202933.6

(51) Int. Cl.
*E21B 47/18* (2012.01)
*G01V 11/00* (2006.01)
(Continued)

(52) U.S. Cl.
CPC ............ *E21B 47/182* (2013.01); *E21B 34/06* (2013.01); *E21B 43/12* (2013.01); *E21B 47/18* (2013.01);
(Continued)

(58) Field of Classification Search
CPC ...... E21B 47/18; E21B 47/182; E21B 47/185; E21B 47/187
See application file for complete search history.

(56) References Cited

U.S. PATENT DOCUMENTS

| 4,869,100 A | 9/1989 | Birdwell |
| 4,905,778 A * | 3/1990 | Jurgens ................. E21B 47/187 166/320 |

(Continued)

FOREIGN PATENT DOCUMENTS

| CN | 2431400 Y | 5/2001 |
| CN | 101573507 A | 11/2009 |
| WO | WO-2006041308 A2 | 4/2006 |

OTHER PUBLICATIONS

Search Report of the UK Intellectual Property Office for Application No. GB1202933.6 dated Apr. 19, 2012.

*Primary Examiner* — Tara E Schimpf
(74) *Attorney, Agent, or Firm* — Harness, Dickey & Pierce, P.L.C.

(57) ABSTRACT

The flow control device includes a flow path, a compensation chamber and a regulator assembly defining a first surface exposed to the flow path and an opposing second surface which is exposed to the compensation chamber. A drive arrangement is provided for moving the regulator assembly to vary the flow path. Fluid flowing through the flow path establishes a pressure which varies across the first surface of the regulator assembly. The compensation chamber is in pressure communication with a localised region of the first surface which is selected to establish a compensation chamber pressure which acts against the second surface of the regulator assembly to bias the regulator assembly in a desired direction. The first surface of the regulator assembly may define a profile configured to minimise the variation in pressure applied over the first surface by action of fluid flowing through the flow path.

24 Claims, 5 Drawing Sheets

(51) Int. Cl.
  *E21B 43/12* (2006.01)
  *E21B 34/06* (2006.01)
  *F16K 3/26* (2006.01)
  *F16K 3/34* (2006.01)
  *F16K 27/04* (2006.01)

(52) U.S. Cl.
  CPC .......... *E21B 47/185* (2013.01); *E21B 47/187* (2013.01); *F16K 3/26* (2013.01); *F16K 3/34* (2013.01); *F16K 27/041* (2013.01); *G01V 11/002* (2013.01)

(56) References Cited

U.S. PATENT DOCUMENTS

| | | | |
|---|---|---|---|
| 2007/0023718 A1* | 2/2007 | Menconi | E21B 47/187 251/123 |
| 2010/0157735 A1* | 6/2010 | Allan | E21B 47/187 367/84 |
| 2012/0327742 A1* | 12/2012 | Kusko | G01V 1/137 367/25 |

* cited by examiner

Prior Art

FLOW CONTROL DEVICE AND METHOD

FIELD OF THE INVENTION

The present invention relates to a flow control device and method, and in particular, but not exclusively, to a flow control device and method for imparting pressure fluctuations within a flow, such as a flow of hydrocarbons, for wireless communication.

BACKGROUND TO THE INVENTION

To optimise recovery, the oil industry depends on gathering data from wells and reservoirs. Such data forms the basis for nearly every decision with respect to the development and operation of an oil field, including where to locate new wells, maintenance programs and allocation/control of production.

In view of this need for data, many well applications are completed with permanently installed downhole instrumentation, such as pressure and temperature monitoring devices. Due to the generally harsh wellbore environment, permanent instrumentation has a limited lifetime and there is an expectancy of failure. Such failure leads to limited obtainable information from the reservoir and limited control possibilities. This may have a serious impact on the understanding and modelling of the reservoir and reduce the reservoir recovery factor.

Furthermore, known installations typically require electrical supply and communication lines running the length of the production tubular from the wellhead down to the downhole monitoring and/or control system, said lines normally being secured to the production tubular using tailored clamps. Fitting cables to the tubing is a time consuming activity that prolongs the installation time. During the installation and use of equipment such as traditional downhole pressure and temperature sensors, the cables, clamps, splices, penetrators, connectors and the like may become exposed to well fluids and are natural failure nodes. If damage occurs, the worst-case scenario is that the entire length of tubing must be retrieved to replace a damaged cable. If the damaged equipment is repairable, a well service operation must be performed.

Other borehole devices, such as multiphase flow meters, sand detectors, valves, chokes, circulation devices and the like may also be installed as part of a permanent borehole completion, and where this is the case similar problems as described above apply.

Depending on the well conditions, the lifetime expectancy of permanent installed equipment may range from a few months to a few years, and as noted above should permanent equipment fail, the only remedy in most cases is to re-complete the well, meaning replacing the production tubular and associated systems. This operation entails high risk and cost and is generally very undesirable.

Retrofit downhole monitoring and/or control systems are desirable in the art for use in the event of failure or compromise in permanent monitoring systems, thus permitting the continuity of dataflow from the well to be regained/maintained. In addition to such retrofit solutions, there is a recognised desire for downhole monitoring and/or control systems that are easily installed, retrieved and maintained, in order to provide for a long-term monitoring and/or control functionality in harsh well conditions.

WO 2006/041308 describes systems for downhole data acquisition and wireless data transmission in a well, and wireless downhole control systems enabling remote wireless flow control of downhole production and/or injection zones in a well related to the production of hydrocarbons. Specifically, operation of a restricting valve element in the pipe flow can be used to send a wireless telegram in an oil or gas well, i.e. wireless signal transmission is achieved by transmitting pressure pulses via flowing fluid.

SUMMARY OF THE INVENTION

According to a first aspect of the present invention there is provided a flow control device, comprising:
a flow path;
a compensation chamber;
a regulator assembly defining a first surface which is exposed to the flow path and an opposing second surface which is exposed to the compensation chamber; and
a drive arrangement for moving the regulator assembly to vary the flow path;
wherein, in use, fluid flowing through the flow path establishes a pressure which varies across the first surface of the regulator assembly, and the compensation chamber is in pressure communication with a localised region of the first surface which is selected to establish a compensation chamber pressure which acts against the second surface of the regulator assembly to bias the regulator assembly in a desired direction.

The present invention may permit desired biasing of the regulator assembly to be achieved using the flowing fluid. Biasing the regulator assembly may permit appropriate operation or action in the event of failure of the drive arrangement, for example. Furthermore, biasing the regulator assembly in a desired direction may assist to minimise the power requirements of the drive arrangement. For example, minimal power requirements may be necessary when the regulator assembly is to be moved by the drive assembly in the direction of the bias.

The effect of the present invention may be achieved by the recognition that during use the pressure varies across the first surface of the regulating assembly and thus appropriately selecting a desired localised region on the first surface from which to communicate pressure to the compensation chamber. In this way, the compensation chamber pressure may be determined as a function of the position of the localised region on the first surface of the regulator assembly.

The flow control device may be configured for use with flow associated with a wellbore, such as production flow, injection flow or the like. The flow control device may be configured for use within a wellbore, for example at a downhole location. The flow control device may define a downhole flow control device.

The regulator assembly may be moveable to vary the flow through or along the flow path. The regulator assembly may be moveable to vary the flow path between fully open and fully closed positions. The regulator assembly may be moveable to vary the flow path intermediate fully open and fully closed positions. The regulator assembly may be moveable to vary the flow path to impart pressure fluctuations within the flowing fluid. Such pressure fluctuations may be utilised for wireless communication within a wellbore, for example as described in WO 2006/041308, the disclosure of which is incorporated herein by reference.

The regulator assembly may be moveable to vary the flow path to provide choking to the flow, for example to control production/injection pressures and rates. The flow control device may be configurable as an inflow or outflow control device.

The regulator assembly may be biased in a direction in which the flow path is open, for example fully open. In such an arrangement the flow path may be operated and held in an open configuration in the event of, for example, failure of the drive arrangement. This may permit the flow path to remain operational in the event of such a failure, which has significant advantages in wellbore applications, for example.

In an alternative embodiment the regulator assembly may be biased in a direction in which the flow path is closed.

The pressure which varies across the first surface will generate a force acting on the regulator assembly through said first surface, and the compensation chamber pressure will generate a force acting on the regulator assembly through said second surface, wherein the magnitude of these forces differs to establish a bias force which biases the regulator assembly in the desired direction. The position of the localised region of the first surface may determine the compensation chamber pressure and thus influence the magnitude of force applied on the regulator assembly through the second surface.

During steady state flow conditions a constant variation in pressure may be created over the first surface of the regulator assembly. Thus, during steady state conditions, a constant force may be generated on the regulator assembly through the first surface.

The compensation chamber pressure may correlate with, for example be substantially equalised with, the pressure at the localised region of the first surface of the regulator assembly. During steady state flow conditions the compensation chamber pressure may be substantially constant and as such a substantially constant force may be generated through the second surface.

The flow control device may be configured to establish a bias force for all flowing conditions of fluid through the flow path. Accordingly, in use the regulator assembly may be continuously biased in the desired direction.

The device may comprise a pressure conduit extending between the compensation chamber and the localised region of the first surface of the regulator assembly to facilitate pressure communication therebetween. The pressure conduit may be at least partially be provided as part of the regulator assembly. The pressure conduit may define a port within the first surface of the regulator assembly, such that the local pressure acting against the first surface of the regulator assembly at the location of the port is communicated to the compensation chamber. The pressure conduit may permit fluid communication between the flow path and the compensation chamber. In such an arrangement the compensation chamber may be exposed to the fluid flowing through the flow path. In other embodiments the compensation chamber and the flow path may be fluidly isolated from each other. In such an arrangement pressure communication may be achieved using a pressure transfer arrangement, such as a bellows structure, piston assembly of the like.

The pressure variation across the first surface of the regulator assembly may be established by a flow regime of the fluid flowing through the flow path. For example, the flow regime may comprise regions of lower velocity, and thus higher pressure, and regions of higher velocity, and thus lower pressure. Regions of lower velocity may be created by the fluid impinging against a surface of the flow control device, collision of different flow streams or the like.

In use, fluid flowing through the flow path may establish a larger pressure on a central region relative to an outer region of the first surface of the regulator assembly. In such an arrangement where a larger compensation chamber pressure is desired the localised region of the first surface which is in pressure communication with the compensation chamber may be located towards the centre of the first surface. Alternatively, where a lower compensation chamber pressure is desired the localised region of the first surface which is in pressure communication with the compensation chamber may be located towards the outer region of the first surface.

In an alternative embodiment fluid flowing through the flow path may establish a larger pressure on an outer region of relative to a central region of the first surface of the regulator assembly.

The flow control device may comprise a housing which at least partially defines the flow path. The housing may be at least partially defined by a tubular member. The housing may be configured to be mounted within a wellbore, for example via one or more tubing hangers, packers or the like.

The housing may comprise or define at least one flow port for accommodating flow through the flow path. A plurality of flow ports may be provided. The flow ports may be distributed axially along the length of the housing. The flow ports may be distributed circumferentially around the housing. At least one flow port may be defined in or through a wall of the housing. At least one flow port may provide fluid communication between external and internal locations of the housing. At least one flow port may permit communication between the flow path and a subterranean zone, such as a production zone, injection zone or the like.

At least one flow port may define an inlet flow port for permitting inlet flow into the flow path. Such an arrangement may have application in wellbore production flow operations. At least one flow port may define an outlet flow port for permitting outlet flow from the flow path. Such an arrangement may have application in wellbore injection flow operations.

At least one flow port may form part of the flow path.

The regulator assembly may cooperate with at least one flow port to vary the flow through the flow path. For example, the regulator assembly may be configured to selectively block, or partially block, at least one flow port.

Flow entering the housing via at least one flow port may establish a flow regime which creates the varying pressure across the first surface of the regulator assembly. For example, flow from at least two flow ports, for example diametrically opposing flow ports may collide to generate a region of low flow velocity and high pressure.

At least one flow port may define a geometry to assist in creating a desired flow regime through the flow path. For example, although a variable pressure across the first surface of the regulator assembly is required, at least one flow port may define a geometry to eliminate very large variations in pressure across said first surface. At least one flow port may define a geometry to assist to minimise stagnation of flow within the flow path. At least one flow port may be obliquely aligned relative to a central axis of the housing.

At least one flow port may define a geometry which compliments the geometry of the first surface of the regulator assembly. For example, at least one flow port may define an angle which corresponds to an angle of a profile of the first surface. This arrangement may facilitate the generation or control of a desired flow regime within the flow path.

The housing may comprise or define at least one by-pass flow port. The bypass-flow port may be configured to be open at all times. The by-pass flow port may not be affected by the regulator assembly. The by-pass flow port may permit by-pass of fluid through the flow path, for example in the event of failure of the regulator assembly, to accommodate large flow rates or the like.

The first surface of the regulator assembly may define a geometry to assist in creating a desired flow regime and pressure distribution across said surface. For example, although a variable pressure across the first surface of the regulator assembly is required, said first surface may define a geometry which functions to eliminate very large variations in pressure across said first surface. The first surface may define a geometry to divert, for example gradually divert, fluid flow along the direction of the flow path. For example, the first surface may define a geometry which diverts incoming flow, for example via at least one flow port, along the direction of the flow path. The first surface may define a geometry which gradually changes the flow direction of the flow to become aligned with the flow path. Such a geometry may minimise stagnation of flow. The first surface may define a conical or frusto-conical profile. The first surface may define a parabolic conical profile. The first surface may define a partially spherical surface, such as a domed surface.

The regulator assembly may be mounted within the housing. The regulator assembly may be axially moveable within the housing to vary the flow path. The compensation chamber may be located or defined within the housing. The drive arrangement may be located within the housing.

The regulator assembly may separate the flow path and the compensation chamber. The flow control device may comprise a sealing arrangement configured to provide a seal between the regulator assembly and the housing. The sealing arrangement may provide sealing between the flow path and the compensation chamber. The pressures acting against the respective first and second surfaces of the regulator assembly may be applied across the sealing assembly. The sealing assembly may define equivalent sealing areas on both sides of the regulator assembly. Alternatively, different seal areas may be provided which may contribute to generation of a bias.

The drive arrangement may comprise a fluid drive arrangement, such as a piston arrangement. The drive arrangement may comprise a mechanical drive arrangement, such as a motor drive arrangement. The drive arrangement may function to act against the bias on the regulator assembly, for example to move the bias assembly in a direction opposing the bias.

The flow control device may be configured to be mounted within existing equipment within a wellbore. The flow control device may be configured to be retrofitted within a wellbore. The flow control device may be configured to be installed within a wellbore as part of a wellbore completion. The flow control device may be configured to be installed within a wellbore using one or more of packers, hangers or the like.

The regulator assembly may comprise a single element, wherein one side of the single element defines the first surface and an opposing side defines the second surface. The regulator assembly may comprise a plurality of elements.

According to a second aspect of the present invention there is provided a method of controlling flow, comprising:

defining a flow path and a compensation chamber within a flow control device;

providing a regulator assembly which defines a first surface which is exposed to the flow path and an opposing second surface which is exposed to the compensation chamber, wherein the regulator assembly is moveable by a drive arrangement to vary the flow path;

passing fluid through the flow path to establish a pressure which varies across the first surface of the regulator assembly; and communicating pressure from a localised region of the first surface to the compensation chamber to establish a compensation chamber pressure which acts against the second surface of the regulator assembly to bias the regulator assembly in a desired direction.

The flow control device may be configured in accordance with the first aspect. In such an arrangement features and associated methods of use of the first aspect may apply to the second aspect.

According to a third aspect of the present invention there is provided a wireless communication assembly, comprising:

a flow path;

a compensation chamber;

a regulator assembly defining a first surface which is exposed to the flow path and an opposing second surface which is exposed to the compensation chamber; and a drive arrangement for moving the regulator assembly to vary the flow path to impart pressure fluctuations within a flow, wherein said pressure fluctuations are encoded with data;

wherein, in use, fluid flowing through the flow path establishes a pressure which varies across the first surface of the regulator assembly, and the compensation chamber is in pressure communication with a localised region of the first surface which is selected to establish a compensation chamber pressure which acts against the second surface of the regulator assembly to bias the regulator assembly in a desired direction.

According to a fourth aspect of the present invention there is provided a flow control device, comprising:

a flow path and a compensation chamber;

a regulator assembly separating the flow path from the compensation chamber; and a drive arrangement for moving the valve element to vary the flow path;

wherein in use fluid flowing through the flow path establishes a first region of higher pressure and a second region of lower pressure, and the compensation chamber is in pressure communication with one of the first and second regions to establish a desired force differential across the regulator assembly.

According to a fifth aspect of the present invention there is provided a flow control device, comprising:

a flow path and a compensation chamber in pressure communication with each other;

a regulator assembly defining a first surface which is exposed to the flow path and an opposing second surface which is exposed to the compensation chamber; and a drive arrangement for moving the regulator assembly to vary the flow path;

wherein the first surface defines a profile which is configured to minimise the variation in pressure applied over said first surface by action of fluid flowing through the flow path.

Accordingly, any effects of varying pressure which may otherwise establish an adverse bias on the regulator assembly may be minimised. This may therefore permit the point at which pressure is drawn or bled from the flow path to be communicated to the compensation chamber to be of less importance. For example, the point at which pressure is drawn may be established on the basis of other factors, such as manufacturing simplicity and the like.

Furthermore, minimising any adverse bias may facilitate low power operation of the drive arrangement.

The first surface may define a geometry to divert, for example gradually divert, fluid flow along the direction of the flow path. For example, the first surface may define a geometry which diverts incoming flow, for example via at least one flow port, along the direction of the flow path. The first surface may define a geometry which gradually changes the flow direction of the flow to become aligned with the flow path. Such a geometry may minimise stagnation of flow. The first surface may define a conical or frusto-conical profile. The first surface may define a parabolic conical profile. The first surface may define a partially spherical surface, such as a domed surface.

The compensation chamber may be in pressure communication with the flow path via a port provided on the first surface of the regulator assembly.

Features associated with the first, and other aspects, may apply to the device according to the fifth aspect.

According to a sixth aspect of the present invention there is provided a method of controlling flow, comprising:

defining a flow path and a compensation chamber within a flow control device and establishing pressure communication between said flow path and compensation chamber;

providing a regulator assembly which defines a first surface which is exposed to the flow path and a second surface which is exposed to the compensation chamber, wherein the first surface defines a profile;

moving the regulator assembly by a drive arrangement to vary the flow path; and passing fluid through the flow path such that the profile of the first surface minimises the variation in pressure applied over said surface.

According to a seventh aspect of the present invention there is provided a flow control device, comprising:

a flow path;

a regulator assembly defining a first surface which is exposed to the flow path; and a drive arrangement for moving the regulator assembly to vary the flow path;

wherein the first surface defines a profile which is configured to minimise the variation in pressure applied over said first surface by action of fluid flowing through the flow path.

According to an eighth aspect of the present invention there is provided a method of controlling flow, comprising:

defining a flow path within a flow control device;

providing a regulator assembly which defines a first surface which is exposed to the flow path, wherein the regulator assembly is moveable by a drive arrangement to vary the flow path;

passing fluid through the flow path;

wherein the first surface defines a profile which is configured to minimise the variation in pressure applied over said first surface by action of fluid flowing through the flow path.

According to a ninth aspect of the present invention there is provided a flow control device, comprising:

a flow path;

a regulator assembly defining a first surface which is exposed to the flow path; and a drive arrangement for moving the regulator assembly to vary the flow path;

wherein the first surface defines a parabolic conical profile which is configured to minimise the variation in pressure applied over said first surface by action of fluid flowing through the flow path.

The flow control device may comprise a compensation chamber which is in pressure communication with the flow path, for example at a region of the first surface of the regulator assembly. The regulator assembly may define a second surface which is exposed to the compensation chamber.

Various different aspects have been defined above. It should be understood that various features of one aspect may be applied, in isolation or in any suitable combination, to any other aspect.

BRIEF DESCRIPTION OF THE DRAWINGS

These and other aspects of the present invention will now be described, by way of example only, with reference to the accompanying drawings, in which.

DETAILED DESCRIPTION OF THE DRAWINGS

Aspects and embodiments of the present invention relate to flow control devices and methods for controlling flow within a wellbore. One exemplary application of such flow control is to provide wireless communication within a wellbore. Such an exemplary application is illustrated in FIG. 1

Figure 1:
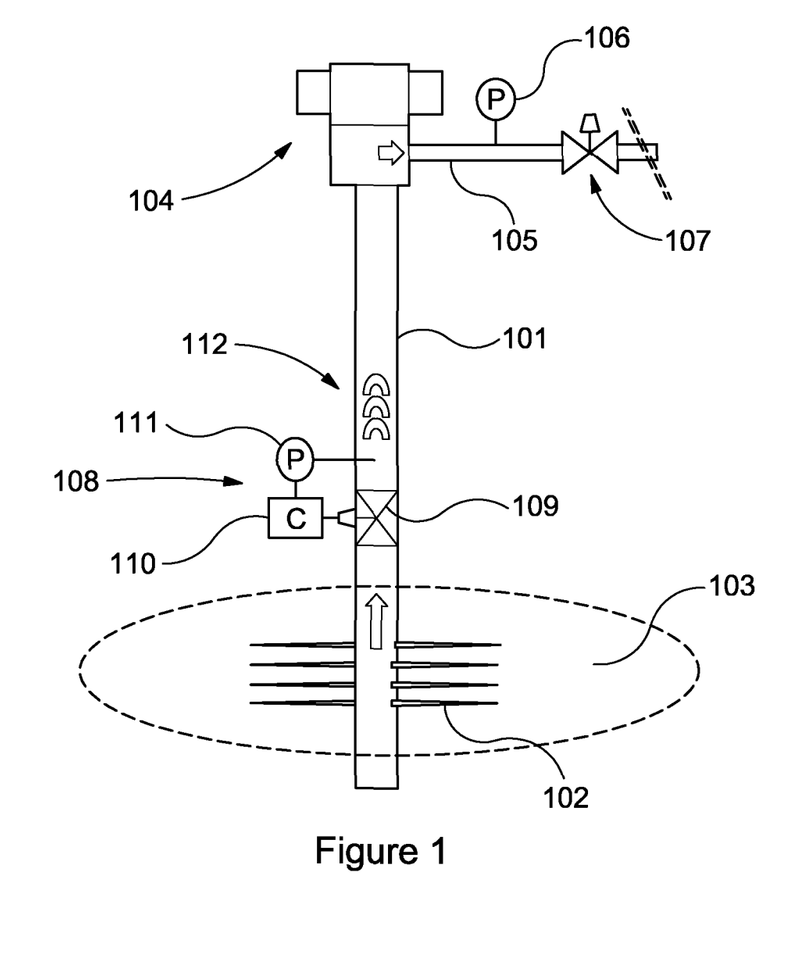
FIG. 1 is a diagrammatic illustration of a wellbore arrangement which includes a device according to an embodiment of the present invention for wirelessly communicating within the wellbore.

FIG. 1 illustrates a wellbore 101 which facilitates production of hydrocarbons such as oil and/or gas from a subterranean reservoir 103 via a set of perforations 102. Somewhere on the surface of the earth the wellbore 101 is terminated in a wellhead 104 which includes appropriate valves and monitoring systems to control and operate the well in accordance with relevant procedures and legislation. Downstream of the wellhead 104 the produced hydrocarbons flow through a flowline 105 to a production facility such as a separator and tank facility (not shown).

Oil or gas fields typically comprise numerous wells, of which most/all produce into the same processing facility. As wells may be of uneven pressure, for example due to penetrating different sections of the reservoir 103 or different reservoir units, regulation is required on surface to ensure that the production from each well arrives at the production facility at equal pressure. In order to provide for this, most flowlines 105 are equipped with a choke valve 107 in order to regulate pressure. Further, most flowlines 105 and/or wellheads 104 are equipped with a pressure sensor 106 to monitor the wellhead pressure.

In the reservoir end of the wellbore 101, a flow control device or system 108 in accordance with aspects of the present invention is shown. The device 108 functions to control the flow to apply pressure signals 112 through the well fluid to provide wireless communication between the surface and downhole location.

The device 108 can be used to monitor and/or control the well. For downhole data monitoring purposes, the device 108 uses one or more sensors, such as a pressure sensor 111. A control module 110 is used to record and process the data. The device 108 comprises a choke/flow regulator valve or assembly 109 which is used to intelligently impose pressure variations 112 on the flowing production fluid in order to transmit the recorded data to surface. On surface, the pressure signals 112 are received by a sensor such as a pressure sensor 106 and an analysis system (not shown) is used to extract the downhole information.

Figure 2:
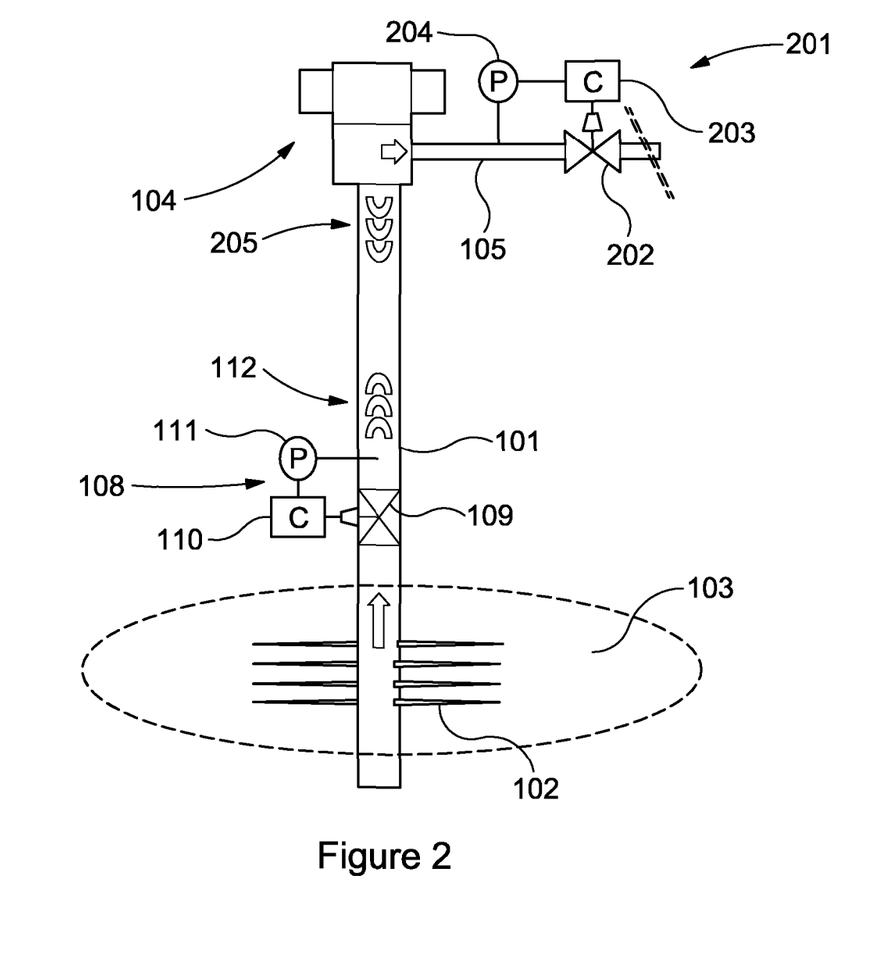
FIG. 2 is a diagrammatic illustration of a modified wellbore arrangement which also includes a device according to an embodiment of the present invention for wirelessly communicating within the wellbore.

FIG. 2 illustrates a wellbore which is largely similar to that shown in FIG. 1, and as such like components share like reference numerals. However, the arrangement shown in FIG. 2 differs in that a flow control device or system 201, which is configured similarly to downhole device 108, is provided at the surface location (effectively replacing or modifying the choke 107 in FIG. 1) and which is used for receiving signals 112 transmitted from the downhole device 108 as well as transmitting pressure signals 205 to said downhole device 108. The device 201 uses one or more sensors, such as a pressure sensor 204. A control module 203 is used to record and process the data. The device 201 comprises a choke/flow regulator valve or assembly 202.

Figure 3:
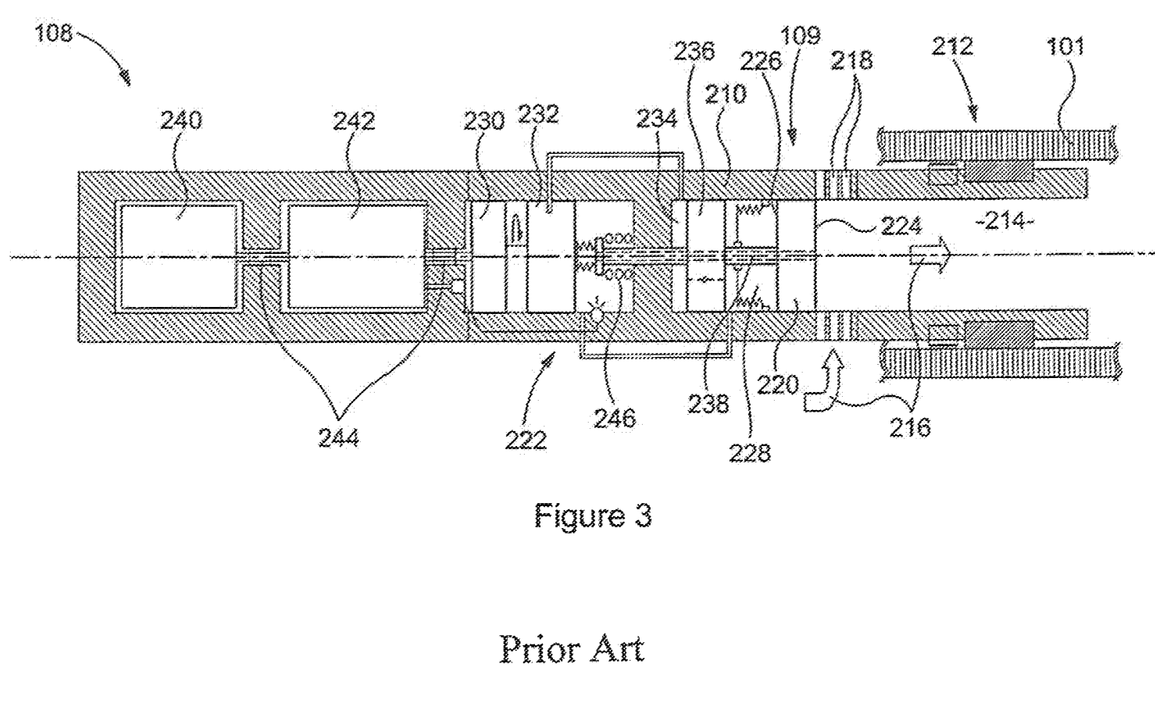
FIG. 3 illustrates an exemplary embodiment a flow control device which is used for wireless communication within a wellbore.

Reference is now made to FIG. 3 in which there is shown one embodiment of a flow control device or system 108 which may be used to monitor downhole conditions, such as pressure and temperature data, and transmit such data wirelessly to surface by means of imposing pressure pulses onto the flowing fluid in the well. The device 108 functions in a similar manner to that described in WO 2006/041308, the disclosure of which is incorporated herein by reference.

The device 108, which includes the choke/flow regulator valve or assembly 109, includes a housing 210 which is secured to the well/production tubing 101 by means of a packer arrangement 212. The packer arrangement 212 restricts the fluid flow 216, which can be both produced as well as injected fluids, along the tubing 101 causing flow through flow ports 218 formed in the wall of the housing 210 and into a flow path 214 which is in fluid communication with surface. A regulator assembly or element 220 is mounted within the housing 210 and is actuated to move by a drive arrangement 222 to vary the flow area through the ports 218 and into the flow path 214 to generate pressure based wireless signals which are then transmitted via the fluid to surface.

The regulator assembly 220 is sealed against the inner surface of the housing and includes a first surface 224 which is exposed to the flow path 214 and a second opposing surface 226 which is exposed to a compensation chamber 228. As will be described in further detail below, a desired interaction between the surfaces 224, 226 and the pressures within the flow path 214 and the compensation chamber 228 provides biasing of the regulator assembly 220 in a desired direction. In some embodiments the regulator assembly is biased in a direction in which the flow ports 218 are fully opened. This may therefore assist to provide a fail-safe measure in the event of, for example, failure of the drive arrangement 222.

The compensation chamber 228 may be provided to prevent hydraulic lock of the regulator assembly during use. Further, as will be described in detail below, the compensation chamber 228 is in pressure communication with the flow path 214 such that the pressure differential across the regulator assembly 220 is generally minimised. This may assist to minimise the power requirements of the drive arrangement 222 to move the regulator assembly 220.

The drive arrangement 222, which is also mounted within the housing, comprises an electric motor 230 which operates a pump 232 to displace a fluid to/from a piston chamber 234 in order to apply work on a drive piston 236 secured to the regulator assembly 220 via shaft 238.

A battery module 240 and an control/electronics module 242 are used to energise and control the operation of the device 108. Pressure bulk heads 244 are utilised to protect the battery module 240 and control/electronic module 242 from process/well pressure.

To transmit one single pressure pulse (negative pulse in this embodiment) the motor 230 is used to operate the pump 232 to pump fluid into a piston chamber 234 to cause the drive piston 236 and regulator assembly 220 (via shaft 238) to shift to the right in FIG. 3. This has the effect of reducing the flow area through the flow ports 218 thus choking the flow and generating a pressure drawdown downstream of the device 108. After having applied the required pressure amplitude (pressure drawdown) for a sufficient period of time to permit detection at surface, the motor 230 is reversed to offload fluids from the piston chamber 234. A spring 246 causes the regulator assembly 220 to retract and the production returns to "normal", i.e. a fully open position.

In many cases, the relatively violent flow regime that is present in oil and gas wells may adversely affect the operation of the device. For example, flow effects in the form of local pressure variations as a result of flow rate variations may apply adverse biasing forces on the regulator assembly 220. In certain situations, forces created by fluid dynamic forces such as ejector effects may overcome the force of the spring 246 and cause malfunction. Ejector effects may also overcome the force created by the pump 232 working on the piston 236.

Further, oil and gas wells may experience scale formation that may cause friction and entail a larger power requirement to operate the device 108.

As will now be described in detail below, the present invention seeks to address such issues by mitigating or alleviating undesirable biasing effects and/or permitting lower power operation.

Figure 4:
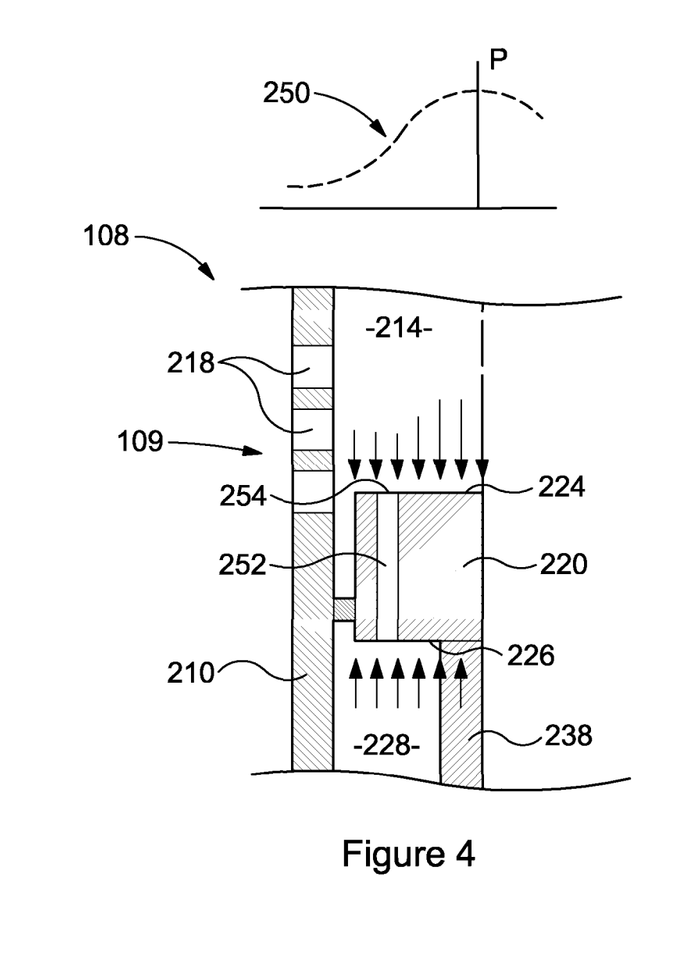
FIG. 4 provides an enlarged view of a flow control device in the region of a regulator assembly according to an embodiment of the present invention.

Reference is now made to FIG. 4 in which there is shown an enlarged view of the flow control device 108 in FIG. 3 in the region of the choke/flow regulator valve or assembly 109. The present inventors have recognised that the flow regime created by fluid flowing through the flow ports 218 and into the flow path 214 establishes a pressure which varies across the first surface of the regulator assembly 220. Specifically, the central region of the first surface 224 receives a higher pressure than the peripheral region of the first surface 224, as illustrated in the superimposed pressure plot 250. The present inventors consider this effect to be a consequence of flow streams from opposing flow ports 218 colliding in a central region of the flow path 214 thus creating a central region of low velocity and thus higher pressure, relative to the peripheral region. The force applied on the regulator assembly 220 via the first surface 224 will thus be a function of this variable pressure.

As illustrated in FIG. 4, the regulator assembly 220 defines a pressure conduit 252 which provides pressure communication between a localised region 254 of the first surface 224 and the compensation chamber 228. Accordingly, the pressure within the compensation chamber 228 will be substantially equalised with the pressure acting at the localised region 254 of the first surface 224, and as such this pressure will be applied substantially uniformly over the second surface 226 of the regulator assembly 220. The compensation chamber pressure and thus force applied by this pressure on the regulator assembly 220 may therefore be a function of the position of the localised region 254 from which pressure is bled from the first surface 224. Appropriate selection of the position of this localised region may therefore permit a desired biasing force to be applied to the regulator assembly 220. In the present embodiment the localised region 254 is selected such that the resulting magnitude of force applied to the regulator assembly via the second surface 226 is lower than the resulting magnitude of force applied to the regulator assembly 220 via the first surface 224. In such an arrangement the net force will act to bias the regulator assembly 220 in a direction in which the ports 218 are open.

Figure 5:
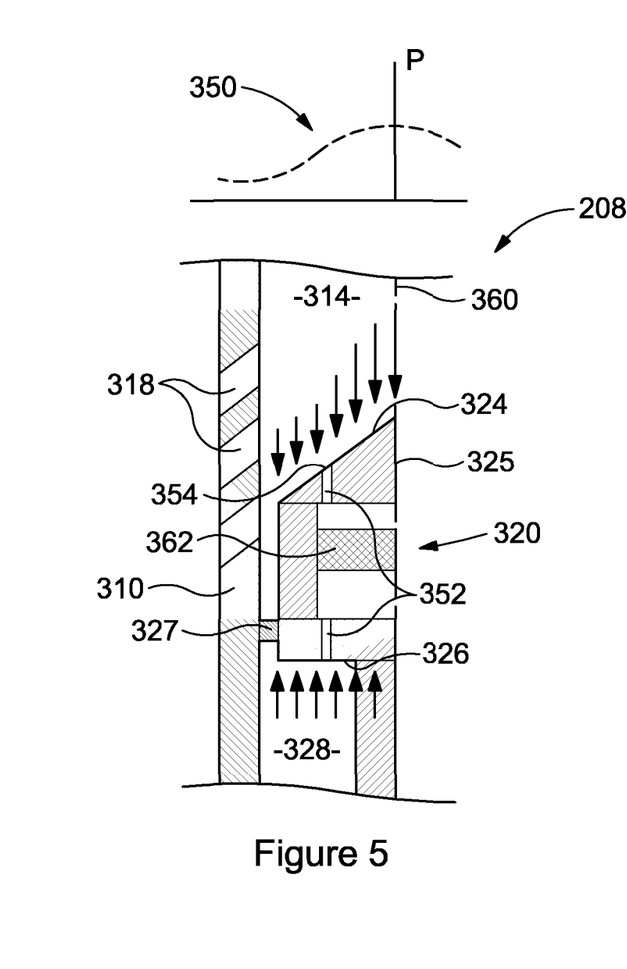
FIG. 5 provides an enlarged view of a flow control device in the region of a regulator assembly according to another embodiment of the present invention.

Reference is now made to FIG. 5 in which a portion of a flow control device 208 in accordance with an alternative embodiment of the present invention is shown. The flow control device 208 of FIG. 5 is similar in most respects to the device 108 shown in FIG. 4 and as such like components share like reference numerals, incremented by 100. Accordingly, the device 208 comprises a housing 310 which includes a number of flow ports 318 which permit fluid to enter the housing 310 and inner flow path 314. The device 208 includes a regulator assembly 320 which is mounted within the housing 310 and is moveable via a drive arrangement (not shown) to interact with the flow ports 318 to vary the flow through the flow path 314 and, for example, impart pressure based wireless communication signals into the flow.

The regulator assembly 320 includes a first surface 324 which is exposed to the flow and which defines a conical shaped geometry. This geometry, which is provided on a cap portion 325, assists to provide a preferred flow regime within the fluid entering the flow path 314. Specifically, the geometry of the first surface 324 acts to gradually deflect the incoming flow to direct this along the direction of the flow path 314, thus minimising reductions in flow velocities, for example caused by colliding flow streams from opposing flow ports 318. Minimising such reductions in flow velocity may therefore permit a more uniform flow velocity distribution to be achieved which in turn may minimise large pressure variations across the first surface 324, as illustrated in the superimposed pressure plot 350. This may therefore neutralise or minimise any adverse biasing of the regulator assembly caused by such variations in pressure across the first surface.

The regulator assembly 320 also defines a second surface 326 which is exposed to a compensation chamber 328. The compensation chamber 328 is in pressure communication with the flow path 314 via a pressure conduit arrangement 352 which is ported at a location 354 on the first surface 324. In some embodiments the geometry of the first surface 324 may be sufficient to neutralise the adverse effects of a variable pressure across said surface 324 such that the port location 354 is not critical. However, in other embodiments the device 208 may utilise the effect of any remaining pressure variation and select the port location 354 appropriately to achieve a desired biasing effect of the regulator assembly 320.

The flow ports 318 are obliquely aligned relative to the central axis 360 of the housing 310 which assists with establishing a desired flow regime within the flow path 314. As illustrated, the flow ports 318 are generally inclined to correspond to the geometry or profile of the first surface 324, further assisting creation of a desired flow regime.

The regulator assembly 320 further comprises a filter 362 which functions to filter fluid being communicated to the compensation chamber 328 via conduits 352. Also, a dynamic seal 327 is provided between the regulator assembly 320 and the housing 310. The seal 327 is provided to prevent leakage of fluid between the regulator assembly 320 and housing 310. Such leakage may otherwise result in fluid flow from the compensation chamber 328 and through the filter 362 into the flow path 314. However, the filter may be considered to represent a restriction to such flow, especially if fouled with particulate matter, such that a back pressure may be created within the compensation chamber 328 which could adversely bias the regulator assembly 320 in a direction to close the ports 318.

Figure 6:
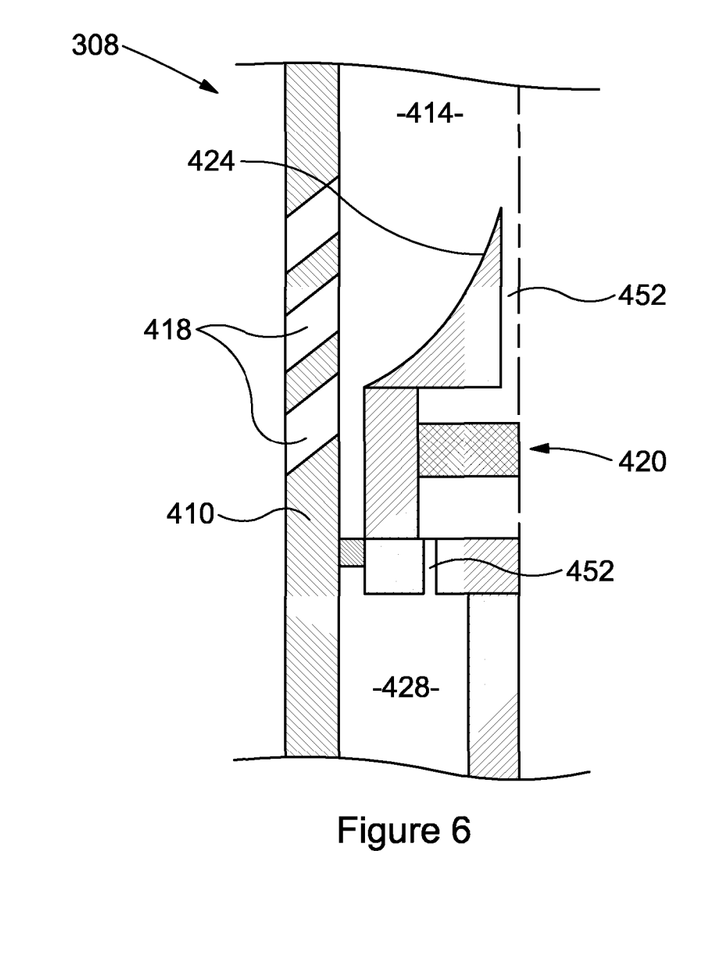
FIG. 6 provides an enlarged view of a flow control device in the region of a regulator assembly according to a further embodiment of the present invention.

A further alternative embodiment of a flow control device, in this case generally identified by reference numeral 308, is shown in FIG. 6. The device 308 of FIG. 6 is largely similar to that shown in FIG. 5 and as such like features share like reference numerals, incremented by 100. For brevity of the present description only the differences between the devices 208, 308 of FIGS. 5 and 6, respectively, will be identified. In this case a first surface 424 of a regulator assembly 420 defines a parabolic conical profile which functions to minimise pressure variations across said surface 424. A centrally located pressure conduit 452 conduit 512 extends through the regulator assembly 420 which facilitates communication of pressure with a compensation chamber 428. Through experimentation the present inventors have recognised surprisingly effective results with such a parabolic conical profile.

Figure 7:
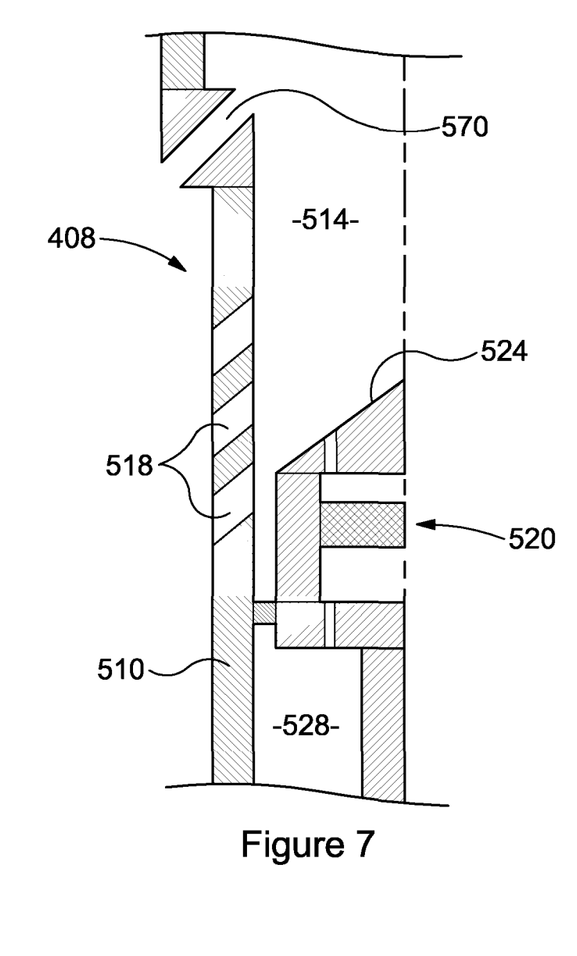
FIG. 7 provides an enlarged view of a flow control device in the region of a regulator assembly according to a still further embodiment of the present invention.

Reference is now made to FIG. 7 in which there is shown a flow control device 408 in accordance with a further alternative embodiment of the present invention. The flow control device of FIG. 7 is similar to the device 208 in FIG. 5, and as such like components share like reference numerals, incremented by 200. For brevity of the present description only the differences between the devices 208, 408 of FIGS. 5 and 7, respectively, will be identified. That is, a housing 510 includes one or more additional flow ports 570 (only one shown), which may be defined as bypass flow ports. These ports 570 are not affected by a regulator assembly 520 and as such remain open, which may have application in wells requiring a high flow capacity through the device 408. It should be noted that the regulator assembly 520 is illustrated as including a conical first surface 524. However, any suitable geometry may be selected, such as the parabolic conical geometry illustrated in FIG. 6.

It should be understood that the embodiments described herein are merely exemplary and that various modifications may be made thereto without departing from the scope of the present invention. For example, in some embodiments the various devices may be configured for outflow of fluid from the respective flow paths, for example to facilitate fluid injection. Furthermore, the devices may be configured to function to provide flow control other than for transmission of signals, for example to function as inflow control devices, production/injection chokes or the like. The devices may be utilised within other flow environments and are not restricted for use within a wellbore.

The invention claimed is:

1. A flow control device, comprising:
a housing defining a specific flow path, at least one port, and a compensation chamber configured to be separated from a flow of fluid in the specific flow path; and
a regulator assembly within the housing and comprising
a first surface further defining the specific flow path,
a second surface opposing the first surface, the second surface further defining the compensation chamber such that the regulator assembly separates the defined compensation chamber from the specific flow path within the housing, and
a drive arrangement configured to move the regulator assembly in opposing first and second directions;
wherein the specific flow path extends from an interior of the housing and into the at least one port to connect the specific flow path with an exterior of the housing,
wherein the regulator assembly defines a pressure conduit permitting pressure communication between the specific flow path and the defined compensation chamber, and
wherein the regulator assembly is configured to
vary pressure within the specific flow path and in the defined compensation chamber by the defined pressure conduit in combination with the at least one port, and
regulate flow through the specific flow path.

2. The flow control device according to claim 1, wherein the regulator assembly is further configured to provide flow control in at least one of production flow and injection flow in a wellbore.

3. The flow control device according to claim 1, wherein the regulator assembly is further configured to impart pressure fluctuations within the specific flow path to provide for wireless communication.

4. The flow control device according to claim 1, wherein the regulator assembly is further configured to open the specific flow path.

5. The flow control device according to claim 1, wherein the regulator assembly is further configured to substantially equalize a compensation chamber pressure with a pressure at the first surface of the regulator assembly.

6. The flow control device according to claim 1, wherein the regulator assembly defines an access port within the first surface of the regulator assembly, the access port coupled to the defined pressure conduit.

7. The flow control device according to claim 1, wherein the at least one port is further defined in a wall of the housing.

8. The flow control device according to claim 1, wherein the housing defines an inlet at the at least one port for permitting inlet flow into the specific flow path.

9. The flow control device according to claim 1, wherein the regulator assembly and the housing, in combination, are configured to vary fluid flow through the specific flow path.

10. The flow control device according to claim 1, wherein the at least one port is obliquely aligned relative to a central axis of the housing.

11. The flow control device according to claim 1, wherein the housing defines at least one by-pass flow port.

12. The flow control device according to claim 1, wherein the first surface of the regulator assembly is configured to vary a pressure distribution across said first surface.

13. The flow control device according to claim 12, wherein the first surface is configured to divert fluid flow along the direction of the specific flow path.

14. The flow control device according to claim 12, wherein the first surface comprises a conical profile.

15. The flow control device according to claim 12, wherein the first surface comprises a parabolic conical profile.

16. The flow control device according to claim 1, wherein the flow control device is configured to be installed within a wellbore.

17. The flow control device according to claim 1, wherein the at least one flow port permits communication between the specific flow path and a subterranean zone including at least one of a production zone and injection zone.

18. The flow control device according to claim 1, wherein the housing defines an outlet of the at least one flow port for permitting outlet flow from the specific flow path.

19. A wellbore comprising:
the flow control device according to claim 1, positioned at a downhole location within a wellbore.

20. The flow control device according to claim 19, wherein the flow control device is mountable within existing equipment within the wellbore of claim 19.

21. A method for controlling flow, comprising:
providing a flow control device, wherein the flow control device comprises
a housing defining a specific flow path, at least one port, and a compensation chamber separated from a flow of fluid in the specific flow path; and
a regulator assembly within the housing, the regulator assembly including
a first surface further defining the specific flow path,
a second surface opposing the first surface, the second surface further defining the compensation chamber such that the regulator assembly separates the compensation chamber from the specific flow path, and
a drive arrangement configured to move the regulator assembly in opposing first and second directions;
permitting fluid to flow through the specific flow path such that said fluid flow varies a pressure within the housing across the first surface of the regulator assembly, the specific flow path extending from an interior of the housing and into the at least one port to connect the specific flow path with an exterior of the housing; and
establishing a compensation chamber pressure which acts against the second surface of the regulator assembly via a pressure conduit defined by the regulator assembly permitting pressure communication between the specific flow path and the defined compensation chamber, by communicating pressure from the first surface, to bias the regulator assembly in one of the first and second directions.

22. A flow control device, comprising:
a housing defining a specific flow path, a flow port and a compensation chamber separated from a flow of fluid in the specific flow path;
a regulator assembly comprising a first surface which further defines the specific flow path and an opposing second surface which further defines the compensation chamber such that the regulator assembly separates the compensation chamber from the specific flow path, the specific flow path extending into the flow port; and
a drive arrangement configured to move the regulator assembly to vary the specific flow path;

wherein the specific flow path is in pressure communication with the defined compensation chamber; and wherein the first surface comprises a parabolic conical profile which is configured to negate variations in pressure applied over said first surface by action of fluid flowing through the flow path via the specific flow port.

23. The device according to claim 22, wherein the compensation chamber is fluidly coupled to the specific flow path via a port provided on the first surface of the regulator assembly.

24. A method for controlling flow, comprising:

defining a specific flow path, a flow port and a compensation chamber within a housing of a flow control device, the compensation chamber being separated from a flow of fluid in the specific flow path;

establishing pressure communication between said specific flow path and compensation chamber;

providing a regulator assembly comprising a first surface which further defines the specific flow path and a second surface which further defines the compensation chamber, the regulator assembly separating the compensation chamber and the specific flow path, and the specific flow path extending into the flow port, moving the regulator assembly by a drive arrangement to vary the specific flow path; and passing fluid through the specific flow path via the flow port such that the profile of the first surface negates variations in pressure applied over said surface;

wherein the first surface comprises a parabolic conical profile.

* * * * *